United States Patent
Kritt et al.

(10) Patent No.: US 9,405,824 B2
(45) Date of Patent: Aug. 2, 2016

(54) CATEGORIZING CONTENT (75) Inventors: Barry A. Kritt, Raleigh, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 633 days.

(21) Appl. No.: 13/536,840

(22) Filed: Jun. 28, 2012

(65) Prior Publication Data
US 2014/0006394 A1  Jan. 2, 2014

(51) Int. Cl.
*G06F 17/30* (2006.01)
(52) U.S. Cl.
CPC ................. *G06F 17/30707* (2013.01)
(58) Field of Classification Search
CPC .......... G06F 17/3053; G06F 17/30598; G06F 17/30867; G06F 17/30707
USPC .......................................... 707/731, E17.082
See application file for complete search history.

(56) References Cited

U.S. PATENT DOCUMENTS

| | | | |
|---|---|---|---|
| 6,490,577 B1 * | 12/2002 | Anwar | G06F 17/3053 |
| 7,606,772 B2 | 10/2009 | Flinn et al. | |
| 2007/0027861 A1 * | 2/2007 | Huentelman et al. | 707/5 |
| 2007/0124701 A1 * | 5/2007 | Gong et al. | 715/854 |
| 2008/0250060 A1 * | 10/2008 | Grois | 707/102 |
| 2008/0313124 A1 * | 12/2008 | Arseneault et al. | 706/50 |
| 2010/0049852 A1 * | 2/2010 | Whitnah et al. | 709/226 |
| 2011/0004831 A1 | 1/2011 | Steinberg et al. | |
| 2011/0137845 A1 | 6/2011 | Ward | |
| 2011/0179385 A1 | 7/2011 | Li et al. | |
| 2012/0005201 A1 * | 1/2012 | Ebanks | 707/728 |
| 2012/0054610 A1 * | 3/2012 | Archer | 715/716 |
| 2013/0125008 A1 * | 5/2013 | Irvine | 715/739 |

OTHER PUBLICATIONS

Lei Zhang, Zhichao Wang, Ontology-based Clustering Algorithm with Feature Weights, Journal of Computational Information Systems, 2010.
Hotho et al., Ontology-based Text Clustering, http://www.aifb.uni-karlsruhe.de/WBS/, Institute AIFB University of Karlsruhe, 2001.
Xiaodan Song et al., Modeling and Predicting Personal Information Dissemination Behavior, ACM Digital Library, 2005.

* cited by examiner

*Primary Examiner* — Shiow-Jy Fan
(74) *Attorney, Agent, or Firm* — Kunzler Law Group; Damion Josephs (57) ABSTRACT

For categorizing content, a categorizing module categorizes content of a content stream into a category of a plurality of categories. A recording module records a navigation action directed to first content of the content stream. The recording module further elevates a ranking of a first category associated with the first content in response to the navigation action. In addition, the recording module displays highest ranking categories for selection.

14 Claims, 5 Drawing Sheets

CATEGORIZING CONTENT

FIELD

The subject matter disclosed herein relates to categorization of content and more particularly relates to navigation-based categorization of content.

BACKGROUND

Description of the Related Art

Users are exposed to large amounts of content on social media sites, entertainment sites, and other media streams. As a result, content that is most interesting may be missed.

BRIEF SUMMARY

A method for categorizing content is disclosed. The method includes categorizing, by use of a processor, content of a content stream into a category of a plurality of categories and recording a navigation action directed to first content of the content stream. The method also includes elevating a ranking of a first category associated with the first content in response to the navigation action and displaying highest ranking categories for selection. In one embodiment, the method also includes performing a content action on content in a selected category in response to a category selection. In a further embodiment, the content action includes displaying the content of the selected category. In another further embodiment, the content action includes sharing the content of the selected category.

In one embodiment, the plurality of categories is chosen by the user. In another embodiment, the displayed highest ranking categories are sorted based on a criteria selected from the group consisting of a ranking value of each category, category preferences, alphabetizing, cumulative navigation action strength, temporal weight, and an affinity weight to user friends. In another embodiment, the navigation action includes at least one of a scroll pause, a content selection, a content upload, a content comment, a content like, and a cursor hover. In another embodiment, the content stream is selected from the group consisting of a social media content stream, a news content stream, and an entertainment content stream.

In one embodiment, the method listed above is a computer program product for categorizing content. The computer program product includes a computer readable storage medium having computer readable program code embodied therein. The computer readable program code is configured to execute the steps of the method.

A system for categorizing content is disclosed. In one embodiment, the system includes a content source providing a content stream and a categorizing module that categorizes content of a content stream into a category of a plurality of categories. The system also includes a recording module that records a navigation action directed to first content of the content stream, that elevates a ranking of a first category associated with the first content in response to the navigation action, and that displays highest ranking categories for selection.

In one embodiment, the system also includes performing a content action on content in a selected category in response to a category selection, where the content action is selected from the group consisting of displaying the content of the selected category and sharing the content of the selected category. In another embodiment, the plurality of categories is chosen by the user. In another embodiment, the displayed highest ranking categories are sorted based on a criteria selected from the group consisting of a ranking value of each category, category preferences, alphabetizing, cumulative navigation action strength, temporal weight, and an affinity weight to user friends. In another embodiment, the navigation action comprises at least one of a scroll pause, a content selection, a content upload, a content comment, a content like, and a cursor hover. In another embodiment, the content stream is selected from the group consisting of a social media content stream, a news content stream, and an entertainment content stream.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

Figure 1:
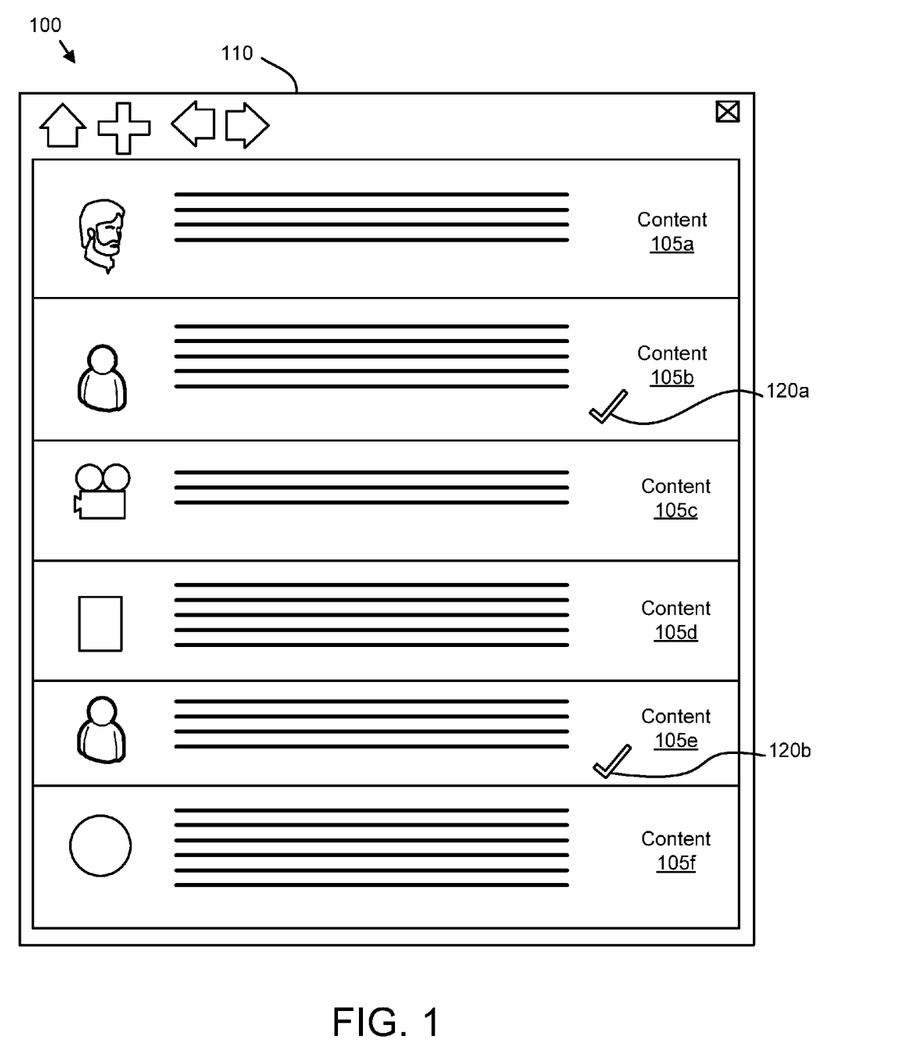
FIG. 1 is a drawing illustrating one embodiment of a content stream.

FIG. 1 is a drawing illustrating one embodiment of a content stream 100. The content stream 100 may be displayed in a browser 110. Alternatively, the content stream 100 may be displayed upon a dedicated device, in a dedicated application window, or the like. The content stream 100 may be a social media content stream, a news content stream, an entertainment content stream, or combinations thereof.

The content stream 100 may include substantial content 105. As a result, the content stream 100 may be tedious to navigate. The described embodiments categorize content 105 and record navigation actions 120 in order to display highest-ranking categories of content 105 for selection as will be described hereafter.

The content stream 100 may include a plurality of content 105. The content 105 may be text, images, video, or combinations thereof. The content 105 may be automatically categorized. In one embodiment, the content 105 is parsed for one or more keywords. The key words may indicate a category for the content 105.

A user may navigate the content stream 100 using one or more navigation actions 120. A navigation actions 120 may be but is not limited to a scroll pause, a content selection, a content upload, a content comment, a content like, a cursor hover, and the like.

In the depicted embodiment, the user navigates the content stream 100 by indicating content like navigation actions 120a-b for content 105b, 105e as depicted, wherein the user indicates a favorable impression of content. Alternatively, a navigation action 120 may be a scroll pause, wherein the user pauses in scrolling through the content stream 100 to view one or more specific contents 105.

In a certain embodiment, the navigation action 120 may be a content selection navigation action 120 wherein the user selects content 105 for a more detailed perusal. Alternatively, the navigation action 120 may be a content upload navigation action 120 wherein the user uploads content 105. In a certain embodiment, the user attaching a comment to content 105 may be a content comment navigation action 120. The navigation action 120 may also be a cursor hover navigation action 120 wherein the user positions a cursor and/or pointing element to hover over content 105.

Figure 2:
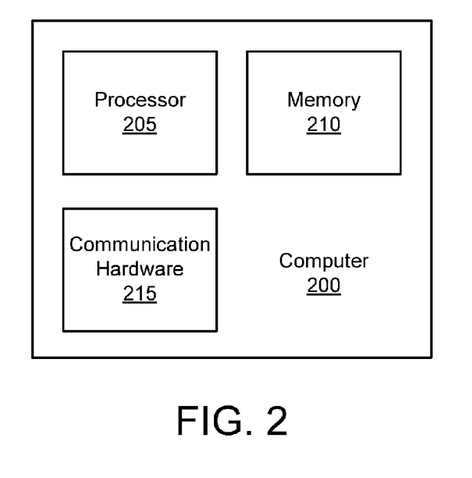
FIG. 2 is a schematic block diagram illustrating one embodiment of a computer.

FIG. 2 is a schematic block diagram illustrating one embodiment of a computer 200. The computer 200 may receive the content stream 100 of FIG. 1. In one embodiment, the computer 200 hosts the browser 110. The computer 200 includes a processor 205, a memory 210, and communication hardware 215. The memory 210 may be a semiconductor memory, a hard disk drive, and optical storage device, a micromechanical storage device, a holographic storage device, or combinations thereof. The memory 210 stores computer readable program code. The processor 205 executes the computer readable program code. The communication hardware 215 communicates with other devices.

Figure 3:
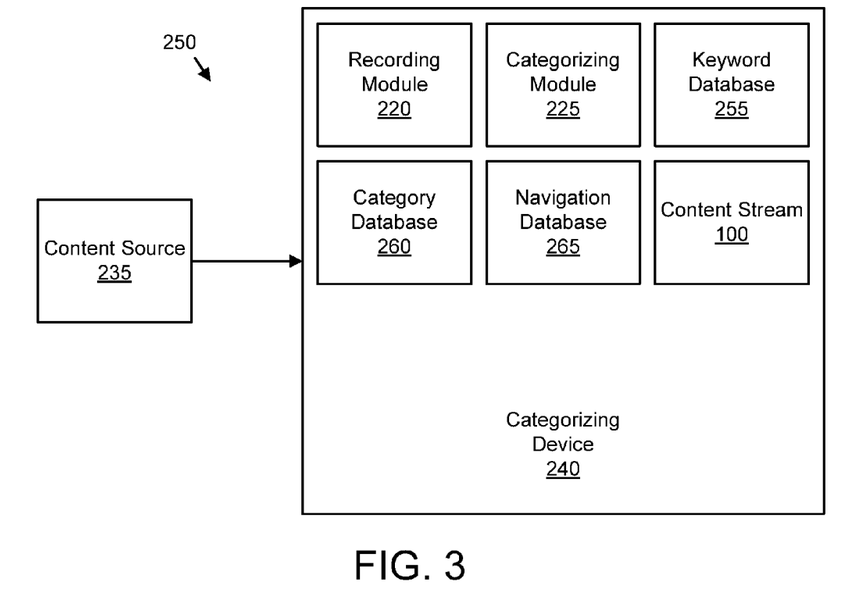
FIG. 3 is a schematic block diagram illustrating one embodiment of a categorizing system.

FIG. 3 is a schematic block diagram illustrating one embodiment of a categorizing system 250. The system 250 includes a content source 235 and a categorizing device 240. The content source 235 may communicate the content stream 100 to the categorizing device 240.

The categorizing device 240 may comprise the computer 200 of FIG. 2. The categorizing device 240 may be a computer workstation, a cellular telephone, a tablet computer, a laptop computer, a dedicated entertainment device, or the like. The content source 235 provides the content stream 100 to the categorizing device 240. The content source 235 may be the Internet, a local area network, a wide area network, a television signal, a radio signal, a cellular telephone signal, or the like.

The categorizing device 240 includes a recording module 220 and a categorizing module 225. The recording module 220 and the categorizing module 225 may be embodied in a computer readable storage medium, such as the memory 210, storing computer readable program code. The processor 205 may execute the computer readable program code to perform the functions of the recording module 220 and the categorizing module 225.

The categorizing module 225 categorizes content 105 of the content stream 100 into a plurality of categories. The recording module 220 records a navigation action 120 directed to the content 105 of the content stream 100. The recording module 220 further elevates a ranking of the first category of the content 105 in response to the navigation actions 120. In addition, the recording module 220 displays highest-ranking categories of the content 105 for selection.

In one embodiment, the categorizing device 240 includes a keyword database 255, a category database 260, and a navigation database 265. The keyword database 255, the category database 260 and the navigation database 265 may be organized as data stored in the memory 210. In one embodiment, the keyword database 255, the category database 260, and the navigation database 265 are each tables in a categorizing database.

Figure 4:
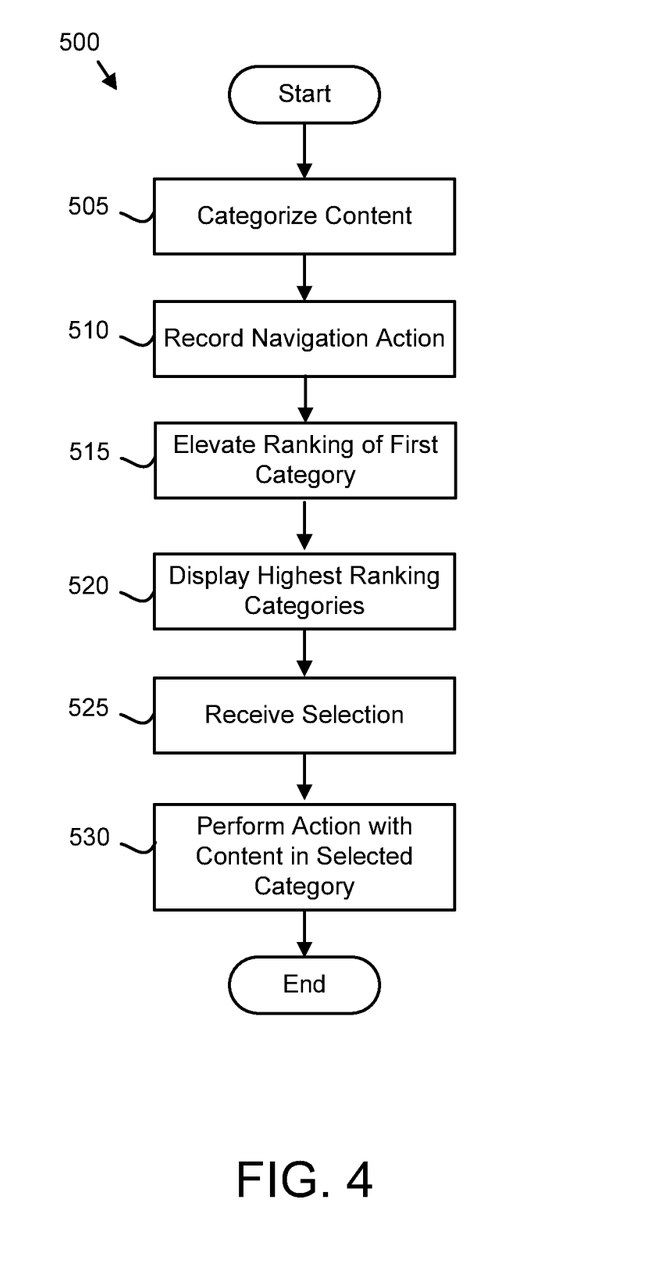
FIG. 4 is a schematic flow chart diagram illustrating one embodiment of a categorizing method.

FIG. 4 is a schematic flow chart diagram illustrating one embodiment of a categorizing method 500. The method 500 may be performed by the system 250 of FIG. 3. In one embodiment, the method 500 is performed by a computer program product. The computer program product may include a computer readable storage medium such as the memory 210. The computer readable storage medium may store computer readable program code that when executed by the processor 205 performs the method 500.

The method 500 starts, and in one embodiment, the categorizing module 225 categorizes 505 content 105 of the content stream 100. In one embodiment, the categorizing module 225 parses the content 105 to detect one or more keywords and/or one or more key images. In one embodiment, the categorizing module 225 a keyword or key image is detected when a word and/or image of the content stream 100 corresponds to words and/or images in the keyword database 255.

In a certain embodiment, each word and/or image of the keyword database 255 is indexed to at least one category. The categorizing module 225 may categorize 505 the content 105 by selecting the category corresponding to a preponderance of keywords and/or key images in the content 105.

In one embodiment, the categorizing module 225 categorizes 505 all content 105 in the content stream 100. Alternatively, the categorizing module 225 may only categorize 505 content 105 to which a navigation action 120 is directed. For example, the categorizing module 225 may only categorize 505 content 105 that is selected.

In one embodiment, each category has a ranking. The ranking may be a ranking value. In one embodiment, the ranking is a sequential ranking from lowest to highest. Alternatively, the ranking may comprise a plurality of hierarchical levels, with each category assigned to a hierarchical level. In one embodiment, each category is recorded as an entry in the category database 260. The ranking for the category may be associated with the category in the category database 260.

In one embodiment, the plurality of categories is selected by the user. For example, the user may enter categories of interest that are stored in the category database 260. Alternatively, the categories may be discovered from the navigation actions 120. In a certain embodiment, the categories of the category database 260 are specified by an administrator and/or manufacturer. In addition, the user may modify the categories included in the category database 260.

In one embodiment, a category may include one or more subcategories. The subcategories may be defined by the user. Alternatively, the subcategories may be predefined for the category database 260.

The recording module 220 may record 510 a navigation action 120 directed to first content 105 of the content stream 100. For example, the recording module 220 may record 510 a content like navigation action 120 directed the first content 105. Alternatively, the recording module 220 may record 510 a navigation action 120 that is intuited from user behavior. For example, if the user pauses while scrolling through a list of content 105, the recording module 220 may record 510 a scroll pause navigation action 124 for all content that is visible to the user during the scroll pause.

In one embodiment, the navigation actions 120 are recorded in the navigation database 265. The navigation database 265 may include an entry for all categories. Alternatively the navigation database 265 may have an entry for all content 105. The navigation database 265 may record a number and type of navigation actions 120 associated with the category and/or content. The navigation database 265 may also include a timestamp for each navigation action 120. Navigation actions 120 may be deleted from the navigation database 265 after a retention and interval.

In one embodiment, the recording module 220 elevates 515 a ranking of a first category associated with the first content 105 in response to the navigation action 120. For example, if a content comment navigation action 120 is directed to the first content 105, the recording module 220 elevates 515 the ranking of the first category that is associated to the first content 105.

In a certain embodiment, the ranking of a category is elevated 515 using Equations 1 or 2, where R is the ranking, v is a value of a navigation action 120, and t is a time interval since the navigation action 120 occurred.

$$R = \Sigma v/t \qquad \text{Equation 1}$$

$$R = \Sigma v/t^2 \qquad \text{Equation 2}$$

Thus each time a navigation action 120 is recorded 510 for content 105 that is associated with the category, the ranking of the category may be elevated 515. The categories may thus be ranked in the sequence of the ranking values. Alternatively, each hierarchal level may be associated with a ranking range. The recording module 220 may assign each category to a hierarchical level based on the ranking of the category.

In one embodiment, each type of navigation action 120 is associated with the unique value v. A content upload navigation action 120 may have a higher value than a scroll cause navigation action 120. Table 1 lists exemplary values for navigation actions

TABLE 1

| Navigation Action | Value |
|---|---|
| Content selection | 5 |
| Content upload | 10 |
| Content comment | 7 |
| Content like | 3 |
| Scroll pause | 2 |
| Cursor hover | 1 |

The recording module 225 may display 520 the highest-ranking categories. In one embodiment, the highest-ranking categories are displayed 520 for selection. The highest-ranking categories may be displayed as a combo box, a drop-down menu, selection buttons, radio buttons, or the like.

In one embodiment, the displayed highest-ranking categories are sorted. The displayed highest ranking categories may be sorted based on a criteria selected from the group consisting of the ranking value of each category, category preferences, alphabetizing, cumulative navigation action strength, temporal weight, and an affinity weight to user friends.

For example, the category with the highest-ranking value may be displayed first, followed sequentially by categories with lower ranking values. Alternatively, the user may select the category preferences. For example, the user may specify that a first category has preference over a second category.

In one embodiment, the categories are sorted alphabetically. Alternatively, the categories may be sorted by a cumulative navigation action strength. The cumulative navigation action strength for a category may be calculated using Equation 3, where S is the cumulative navigation action strength, v is the navigation action value of each navigation action 120 directed to content 105 associated with the category, and n is a number of navigation actions 120.

$$S = (\Sigma v)/n \qquad \text{Equation 3}$$

In one embodiment, the temporal weight is calculated using Equation 4, where W is the temporal weight and t is the time interval since a last navigation action 120 occurred for content 105 associated with the category.

$$W = 1/t \qquad \text{Equation 4}$$

In one embodiment, all subcategories of the category are displayed. Alternatively, only subcategories with rankings that exceed a ranking threshold are displayed.

In one embodiment, the recording module 225 receives 525 a selection of the displayed categories. The selection may be a user selection. For example, a user may select a category from a drop-down menu.

The recording module 225 may perform 530 a content action on content 105 in the selected category in response to the category selection and the method 500 ends. In one embodiment, the content action is displaying the content 105 of the selected category. Alternatively, the content action may share the content of the selected category with a second user.

Figure 5:
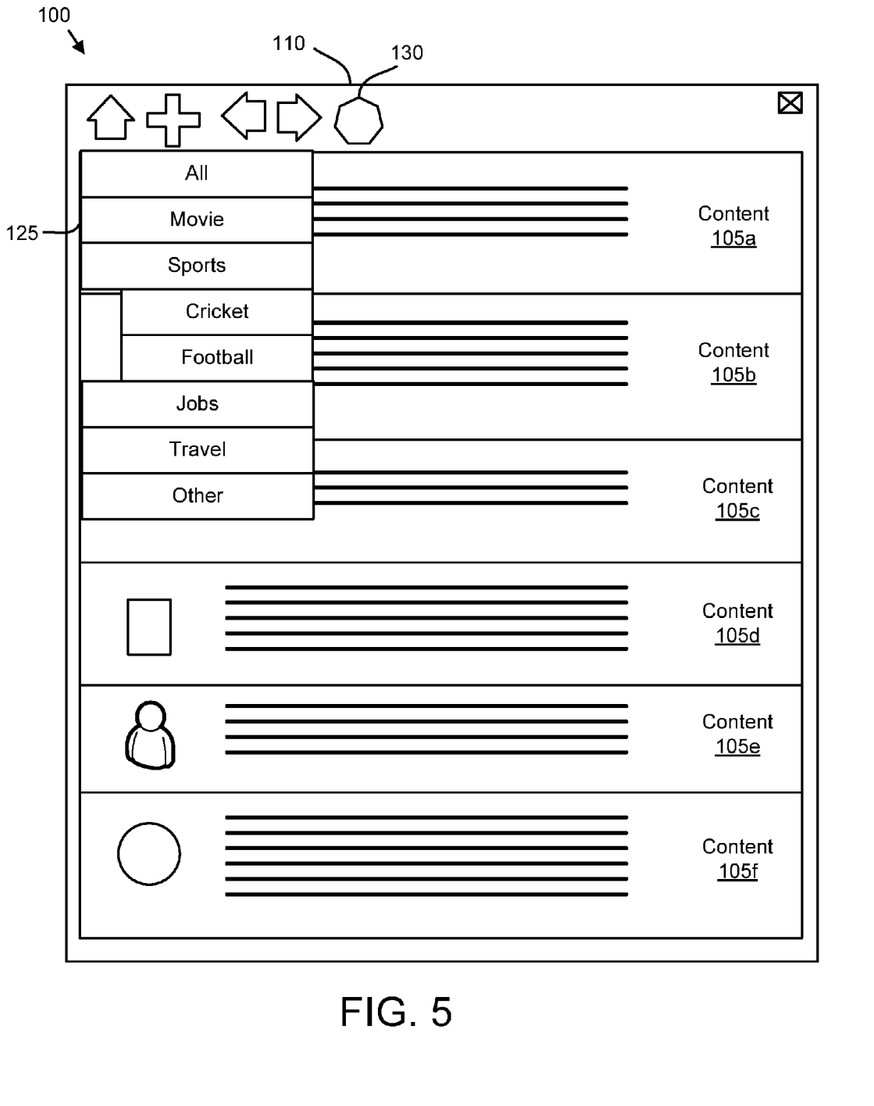
FIG. 5 is a drawing illustrating one embodiment of displayed categories.

FIG. 5 is a drawing illustrating one embodiment of displayed categories 125. The browser 110 of FIG. 1 is shown displaying the content stream 100 of FIG. 1. Categories 125 are also displayed 520 in a menu. The categories 125 may be displayed 520 in response to the users selecting a category icon 130.

The user may select a category 125 from the menu. The recording module 225 receives 525 the selection and performs a content action in response to the category selection.

Figure 6:
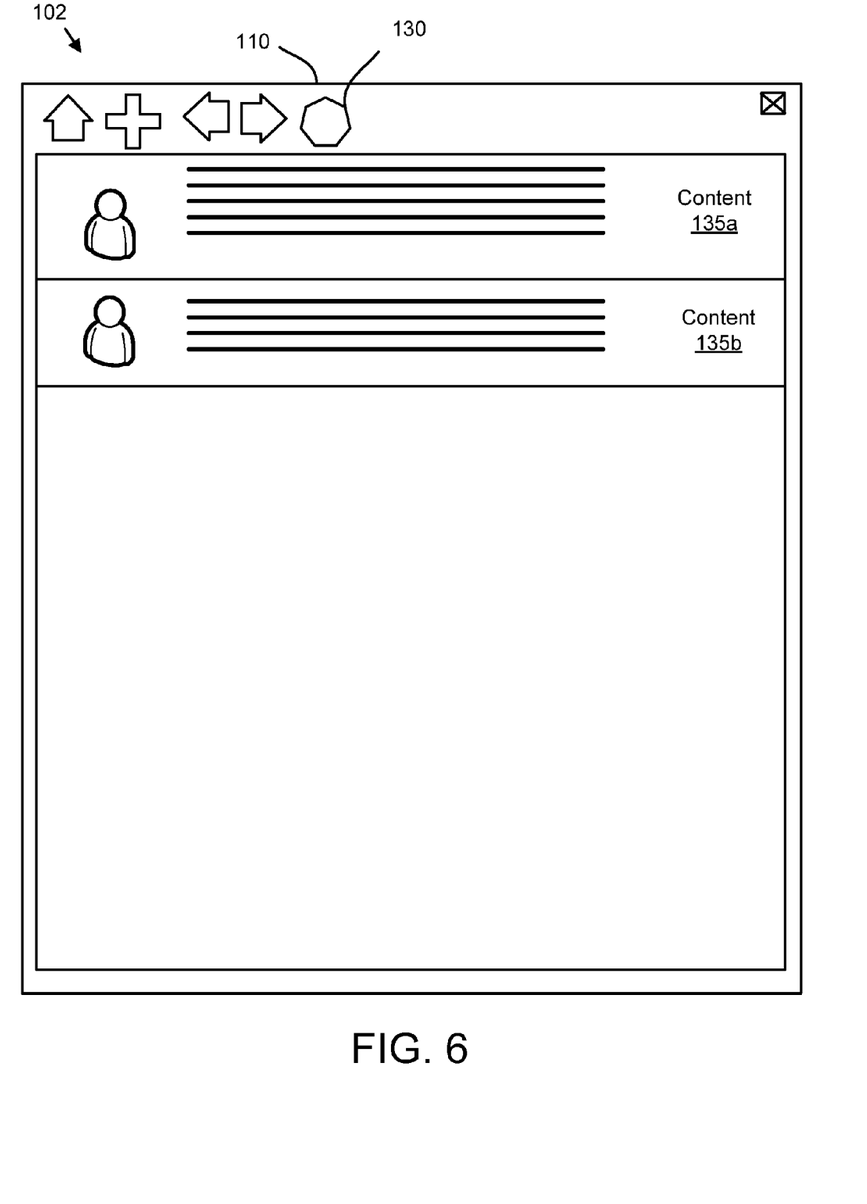
FIG. 6 is a drawing illustrating one embodiment of displayed content.

FIG. 6 is a drawing illustrating one embodiment of displayed content 105. The browser 110 of FIG. 5 is shown displaying selected content 105 in response to a selection of a category 125. For example, the depicted selected content 105 may be displayed in response to the users selecting the "jobs" category in FIG. 5.

By elevating the ranking of categories 125 in response to navigation actions 120, the embodiments described herein display the categories 125 that are likely of most interest to the user. As a result, the user may more easily and quickly navigate to content 105 of interest in the content stream 100.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for categorizing content comprising:

categorizing, by use of a processor, content of a content stream into a category of a plurality of categories, the category selected based on at least a portion of the content corresponding to one or more of a keyword and a key image in a keyword database, the one or more of a keyword and a key image indexed to at least one category of the plurality of categories;

recording a user-generated navigation action directed to first content of the content stream, the navigation action being selected from the group consisting of a scroll pause, a content selection, a content upload, a content like, and a cursor hover, wherein the navigation action comprises an associated value and timestamp indicating when the navigation action occurred, the associated value for the navigation action being unique to the navigation action such that a value associated with one of the navigation actions is different from a value of another navigation action;

elevating a ranking of a first category associated with the first content in response to the navigation action, the ranking being determined according to the function:

$$R = \Sigma v/t,$$

where R is the ranking of the first category, v is a value associated with a navigation action, and t is a time interval since the timestamp indicating when the navigation action occurred such that the ranking is determined as an aggregation of each value for every navigation action associated with the first category and a time interval since the timestamp associated with the navigation action; and displaying highest ranking categories, and subcategories of each of the highest ranking categories, for selection, the displayed highest ranking categories being organized into hierarchical levels, each hierarchical level being associated with a range of rankings, wherein the displayed highest ranking categories within each hierarchical level are sorted based on an affinity weight to user friends.

2. The method of claim 1, further comprising performing a content action on content in a selected category in response to a category selection.

3. The method of claim 2, wherein the content action comprises displaying the content of the selected category.

4. The method of claim 2, wherein the content action comprises sharing the content of the selected category.

5. The method of claim 1, wherein the plurality of categories is chosen by the user.

6. The method of claim 1, wherein the content stream is selected from the group consisting of a social media content stream, a news content stream, and an entertainment content stream.

7. A computer program product for categorizing content, the computer program product comprising a non-transitory computer readable storage medium having computer readable program code embodied therein, the computer readable program code configured to:

categorize content of a content stream into a category of a plurality of categories, the category selected based on at least a portion of the content corresponding to one or more of a keyword and a key image in a keyword database, the one or more of a keyword and a key image indexed to at least one category of the plurality of categories indexed to at least one category of the plurality of categories;

record a user-generated navigation action directed to first content of the content stream, the navigation action being selected from the group consisting of a scroll pause, a content selection, a content upload, a content like, and a cursor hover, wherein the navigation action comprises an associated value and timestamp indicating when the navigation action occurred, the associated value for the navigation action being unique to the navigation action such that a value associated with one of the navigation actions is different from a value of another navigation action;

elevate a ranking of a first category associated with the first content in response to the navigation action, the ranking being determined according to the function:

$$R=\Sigma v/t \qquad \text{Equation 1}$$

where R is the ranking of the first category, v is a value associated with a navigation action, and t is a time interval since the timestamp indicating when the navigation action occurred such that the ranking is determined as an aggregation of each value for every navigation action associated with the first category and a time interval since the timestamp associated with the navigation action; and display highest ranking categories, and subcategories of each of the highest ranking categories, for selection, the displayed highest ranking categories being organized into hierarchical levels, each hierarchical level being associated with a range of rankings, wherein the displayed highest ranking categories within each hierarchical level is sorted based on an affinity weight to user friends.

8. The computer program product of claim 7, the computer readable program code further performing a content action on content in a selected category in response to a category selection, the content action selected from the group consisting of displaying the content of the selected category and sharing the content of the selected category.

9. The computer program product of claim 7, wherein the plurality of categories is chosen by the user.

10. The computer program product of claim 7, wherein the content stream is selected from the group consisting of a social media content stream, a news content stream, and an entertainment content stream.

11. A system comprising:

a processing unit;

a content source providing a content stream using the processing unit;

a memory operably coupled to the processing unit, the memory comprising:

a categorizing module that categorizes content of the content stream into a category of a plurality of categories, the category selected based on at least a portion of the content corresponding to one or more of a keyword and a key image in a keyword database, the one or more of a keyword and a key image indexed to at least one category of the plurality of categories;

a recording module that:

records a user-generated navigation action directed to first content of the content stream, the navigation action being selected from the group consisting of: a scroll pause, a content selection, a content upload, a content like, and a cursor hover, wherein the navigation action comprises an associated value and timestamp indicating when the navigation action occurred, the associated value for the navigation action being unique to the navigation action such that a value associated with one of the navigation actions is different from a value of another navigation action;

elevates a ranking of a first category associated with the first content in response to the navigation action, the ranking being determined according to the function:

$$R=\Sigma v/t,$$

where R is the ranking of the first category, v is a value associated with a navigation action, and t is a time interval since the timestamp indicating when the navigation action occurred such that the ranking is determined as an aggregation of each value for every navigation action associated with the first category and a time interval since the timestamp associated with the navigation action; and displays highest ranking categories, and subcategories of each of the highest ranking categories, for selection, the displayed highest ranking categories being organized into hierarchical levels, each hierarchical level being associated with a range of rankings, wherein the displayed highest ranking categories within each hierarchical level is sorted based on an affinity weight to user friends;

wherein at least a portion of the categorizing module and the recording module comprise one or more of hardware and executable code, the executable code stored on one or more non-transitory computer readable storage media.

12. The system of claim 11, further comprising performing a content action on content in a selected category in response to a category selection, the content action selected from the group consisting of displaying the content of the selected category and sharing the content of the selected category.

13. The system of claim 11, wherein the plurality of categories is chosen by the user.

14. The system of claim 11, wherein the content stream is selected from the group consisting of a social media content stream, a news content stream, and an entertainment content stream.

* * * * *